(12) United States Patent
Shimizu et al.

(10) Patent No.: US 12,514,544 B2
(45) Date of Patent: Jan. 6, 2026

(54) ULTRASOUND CATHETER AND ULTRASOUND CATHETER SYSTEM

(71) Applicant: TERUMO KABUSHIKI KAISHA, Tokyo (JP)

(72) Inventors: Katsuhiko Shimizu, Fujinomiya (JP); Hiroyuki Ishihara, Tokyo (JP); Yasukazu Sakamoto, Hiratsuka (JP); Kazuhiro Satomi, Tokyo (JP); Yoshinao Yazaki, Tokyo (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 74 days.

(21) Appl. No.: 18/173,366

(22) Filed: Feb. 23, 2023

(65) Prior Publication Data

US 2023/0190231 A1    Jun. 22, 2023

Related U.S. Application Data

(63) Continuation of application No. PCT/JP2021/031130, filed on Aug. 25, 2021.

(30) Foreign Application Priority Data

Aug. 26, 2020   (JP) .................................. 2020-142770

(51) Int. Cl.
*A61B 8/12*    (2006.01)
*A61B 8/00*    (2006.01)

(52) U.S. Cl.
CPC ................ *A61B 8/12* (2013.01); *A61B 8/445* (2013.01)

(58) Field of Classification Search
CPC ... A61B 8/12; A61B 8/445; A61B 2090/3966; A61B 8/0841; A61B 8/085;
(Continued)

(56) References Cited

U.S. PATENT DOCUMENTS

| | | | |
|---|---|---|---|
| 4,899,757 A | 2/1990 | Pope et al. | |
| 2014/0180071 A1* | 6/2014 | Stigall ................. | A61B 5/6852 600/424 |

(Continued)

FOREIGN PATENT DOCUMENTS

| | | |
|---|---|---|
| JP | H02503279 A | 10/1990 |
| JP | 2005103018 A | 4/2005 |

(Continued)

OTHER PUBLICATIONS

Edgetech Industries LLC, "Marker Bands" (2015): https://www.edgetechmat.com/product/marker-bands/#:~:text=Edgetech%20Industries%20LLC%20is%20a,is%20a%20disposable%20medical%20material.&text=The%20performance%20requirements%20for%20this,devices%2C%20stents%2C%20and%20angioplasty. (Year: 2015).*

(Continued)

*Primary Examiner* — Kaitlyn E Sebastian
(74) *Attorney, Agent, or Firm* — Buchanan Ingersoll & Rooney PC

(57) ABSTRACT

An ultrasound catheter and an ultrasound catheter system that allow an operator to identify a direction of an image acquired by a transducer. The ultrasound catheter includes: an outer sheath including an accommodation lumen extending from a proximal end to a distal end; a drive shaft movable in an inner sheath along an axial center of the outer sheath; a transducer disposed in the accommodation lumen and fixed to a distal end of the drive shaft; and a radiopaque distal end marker disposed at a distal end portion of the outer sheath, in which the distal end marker includes a marker identification portion extending along the axial center on a part in a circumferential direction, and a marker comparison portion formed in a circumferential direction or a radial (Continued)

direction of the outer sheath with a length and/or an arrangement different from that of the marker identification portion.

5 Claims, 9 Drawing Sheets

(58) Field of Classification Search
CPC ... A61B 8/0883; A61B 8/0891; A61B 8/4461; A61B 8/4466; A61B 8/483
See application file for complete search history.

(56) References Cited

U.S. PATENT DOCUMENTS

| | | | |
|---|---|---|---|
| 2014/0180659 A1* | 6/2014 | Chen | G16H 30/40 |
| | | | 703/11 |
| 2015/0335309 A1* | 11/2015 | Stigall | A61B 8/445 |
| | | | 600/462 |
| 2015/0371382 A1 | 12/2015 | Furuichi et al. | |
| 2016/0374710 A1* | 12/2016 | Sinelnikov | A61B 17/3207 |
| | | | 600/439 |
| 2018/0350064 A1* | 12/2018 | Man | A61B 8/483 |

FOREIGN PATENT DOCUMENTS

| | | | |
|---|---|---|---|
| JP | 2005152443 A | | 6/2005 |
| JP | 2012223206 A | | 11/2012 |
| JP | 2018033507 A | | 3/2018 |
| KR | 20170068944 A | * | 6/2017 |
| WO | 2014136137 A1 | | 9/2014 |

OTHER PUBLICATIONS

International Search Report (PCT/ISA/210) with translation and Written Opinion (PCT/ISA/237) mailed on Nov. 9, 2021, by the Japan Patent Office as the International Searching Authority for International Application No. PCT/JP2021/031130. (9 pages).

* cited by examiner

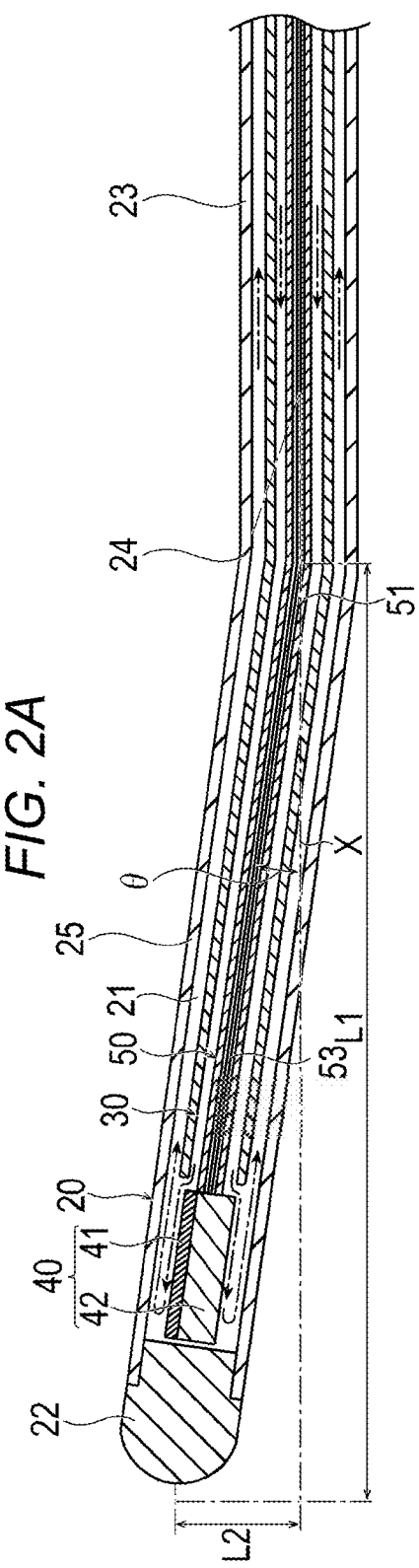
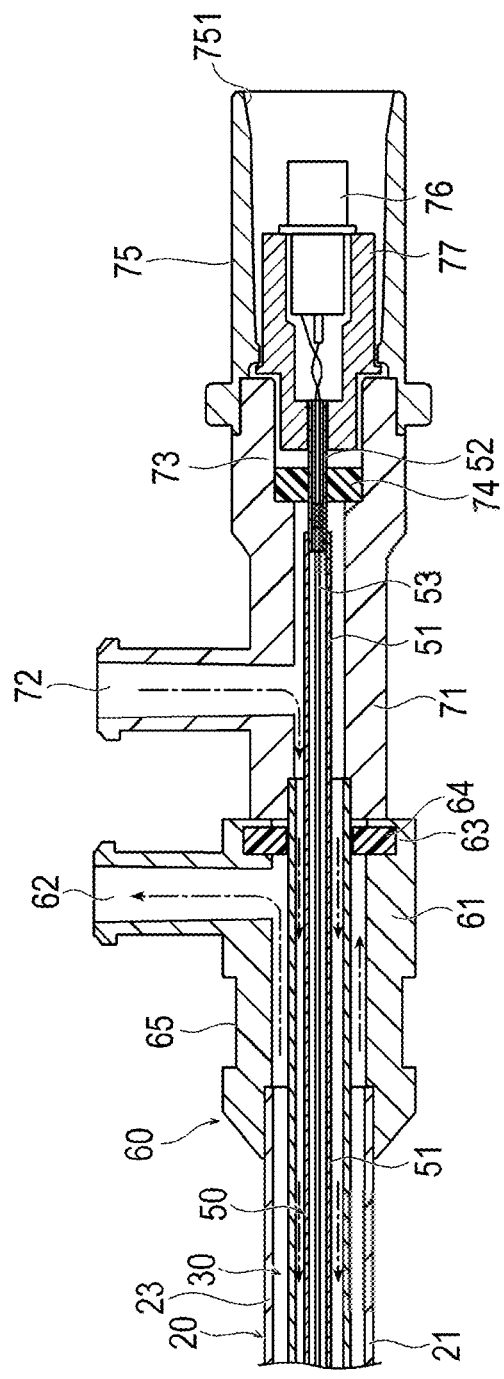
FIG. 2A
FIG. 2B

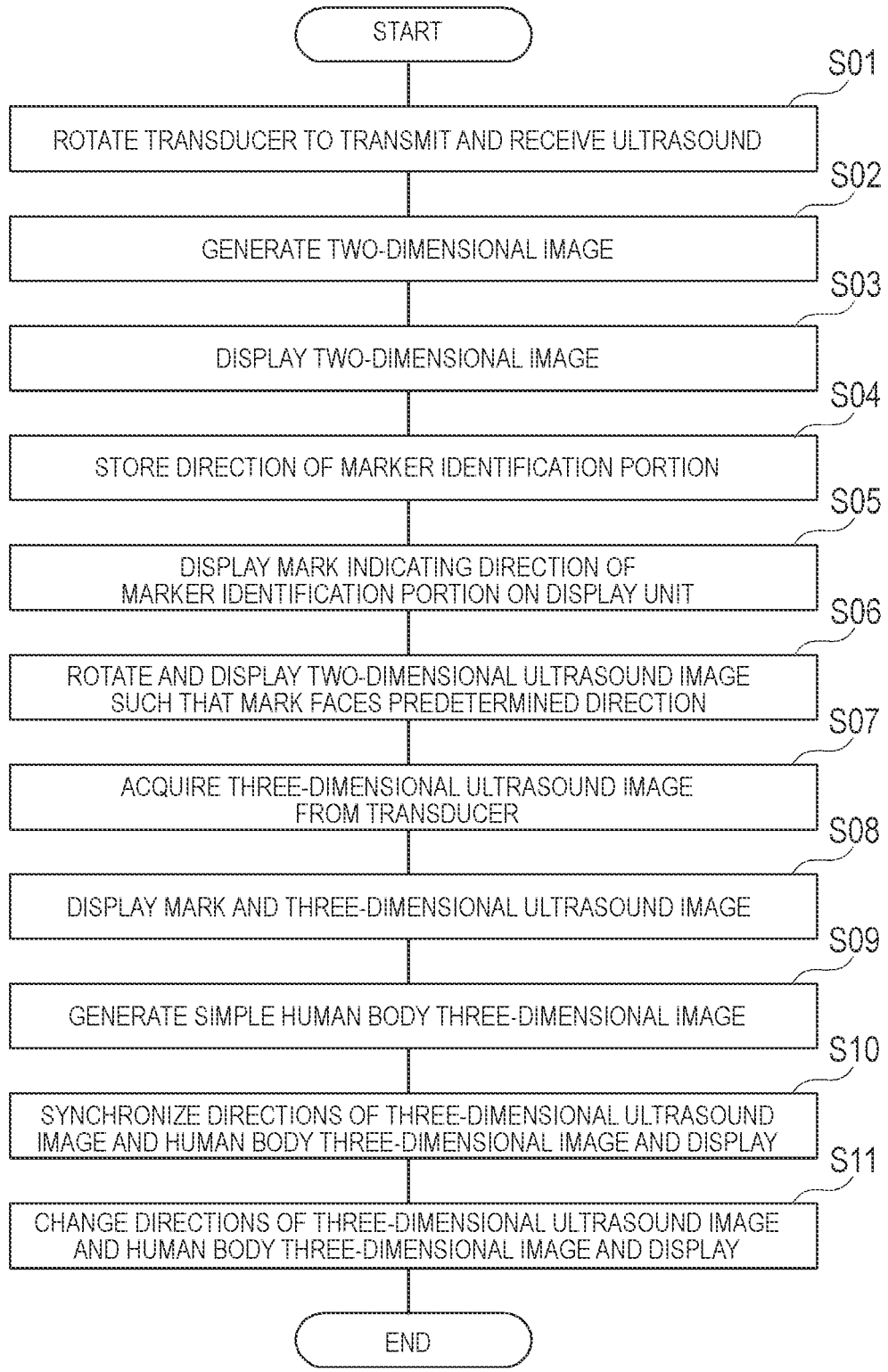

ULTRASOUND CATHETER AND ULTRASOUND CATHETER SYSTEM

CROSS-REFERENCES TO RELATED APPLICATIONS

This application is a continuation of International Application No. PCT/JP2021/031130 filed on Aug. 25, 2021, which claims priority to Japanese Application No. 2020-142770 filed on Aug. 26, 2020, the entire content of both of which is incorporated herein by reference.

TECHNOLOGICAL FIELD

The disclosure generally relates to an ultrasound catheter and an ultrasound catheter system that acquire an image by insertion into a lumen such as a heart or a blood vessel.

BACKGROUND DISCUSSION

When an affected part is examined from a heart, a blood vessel, or the like, an ultrasound catheter that is inserted into a lumen of a living body and acquires an image by using ultrasound is used (for example, see International Patent Publication No. WO2014/136137). The ultrasound catheter includes a transducer that transmits and receives ultrasound, a drive shaft that rotates the transducer, and a sheath that rotatably accommodates the transducer and the drive shaft. The transducer is rotationally driven by the drive shaft in the sheath so as to transmit and receive ultrasound and thus acquire an image in the living body.

A single transducer is disposed and rotated, or a plurality of transducers are disposed in a circumferential direction to acquire a 360° image of a single plane in the circumferential direction. The transducer is moved in an axial direction, and images are overlapped so as to three-dimensionally construct an image. In general, directions of an ultrasound catheter and a transducer inserted into a body are not controlled, and it is difficult to identify a direction to which the transducer faces in the body. Therefore, it is difficult to identify which direction is a predetermined direction (for example, a ventral side) in a body of a patient in an ultrasound image acquired in a heart or an abdomen, for example.

SUMMARY

An ultrasound catheter and an ultrasound catheter system are disclosed that allow an operator to rather easily identify a direction of an image acquired by a transducer.

An ultrasound catheter includes: an outer sheath in which an accommodation lumen penetrating the outer sheath from a proximal end to a distal end is formed; a drive shaft movable in the outer sheath along an axial center of the outer sheath; a transducer disposed in the accommodation lumen and fixed to a distal end of the drive shaft so as to transmit and receive ultrasound; and a radiopaque distal end marker disposed at a distal end portion of the outer sheath, in which the distal end marker includes a marker identification portion extending along the axial center on a part in a circumferential direction of the distal end marker, and a marker comparison portion formed in a circumferential direction or a radial direction of the outer sheath with a length and/or an arrangement different from that of the marker identification portion.

An ultrasound catheter system includes: the ultrasound catheter described above; a drive unit configured to drive the ultrasound catheter; and a control device configured to control the drive unit, in which the drive unit includes a moving portion configured to move the drive shaft along the axial center of the outer sheath under control of the control device, the control device includes a control unit configured to control the moving portion, a display unit configured to receive a signal from the control unit and display an image, and an input unit by which information is input from outside and which transmits the information to the control unit, the control unit performs control so as to receive a signal from the transducer via the drive unit, generate a two-dimensional ultrasound image and/or a three-dimensional image, display the two-dimensional ultrasound image and/or the three-dimensional image on the display unit, automatically identify a direction of the marker identification portion in the two-dimensional ultrasound image and/or the three-dimensional image, or identify the direction of the marker identification portion by an input from the input unit, and display a mark indicating the direction of the marker identification portion on the display unit together with the two-dimensional ultrasound image and/or the three-dimensional image.

The ultrasound catheter configured as described above can identify the direction to which the marker identification portion disposed in the outer sheath faces inside a body based on relative position information on the marker identification portion with respect to the marker comparison portion obtained by X-ray imaging performed from outside of the body, and can identify the direction of the marker identification portion in an ultrasound image based on information on a position of the marker identification portion in the ultrasound image obtained by the transducer in the accommodation lumen. Therefore, the ultrasound catheter allows an operator to rather easily identify a predetermined direction, for example, a direction on a ventral side in a body of a patient in a two-dimensional ultrasound image acquired by the transducer moving along the axial center of the outer sheath in the outer sheath and/or a three-dimensional image of a living tissue generated based on the two-dimensional ultrasound image.

The ultrasound catheter system configured as described above can identify the direction of the marker identification portion disposed in the outer sheath based on relative position information on the marker identification portion with respect to the marker comparison portion obtained by X-ray imaging performed from outside of a body, and can acquire position information on the marker identification portion when acquiring an ultrasound image obtained by the transducer in the accommodation lumen. Therefore, the ultrasound catheter system allows an operator to easily identify a direction of the ultrasound image acquired by the transducer moving along the axial center of the outer sheath in the outer sheath.

The ultrasound catheter may further include a distal end cap connected to the distal end of the outer sheath, in which the marker comparison portion may be provided on the distal end cap, and the marker identification portion may extend toward a proximal end side of the outer sheath beyond a proximal end of the distal end cap. Accordingly, the direction of the ultrasound image in the body can be identified by the distal end marker and the distal end cap. Further, since the marker comparison portion is less likely to enter a range in which the transducer can be observed, it is possible to prevent a range that cannot be observed due to the marker comparison portion from being generated in the ultrasound image obtained by the transducer.

A width of the marker identification portion in the circumferential direction of the outer sheath may be 0.5 mm to 1.5 mm. Accordingly, the marker identification portion can be stably identified by X-ray imaging, and can be stably identified by the ultrasound image obtained by the transducer.

The outer sheath may include one or more bent portions at different positions in an axial center direction, and a radiopaque second marker may be disposed on the bent portion of the outer sheath or at a position adjacent to the bent portion. Accordingly, in the ultrasound catheter, by rotating the outer sheath while observing the second marker by X-ray imaging, a distance and an angle of the transducer in the accommodation lumen with respect to an object to be observed can be adjusted as desired while grasping the position of the bent portion. Therefore, the ultrasound catheter can acquire an image of the object to be observed with high accuracy even when the ultrasound catheter is inserted into a wide lumen.

A width of the second marker in the circumferential direction of the outer sheath may be 0.2 mm to 0.5 mm. Accordingly, since the second marker has a small influence on the ultrasound image, it is possible to prevent a range that cannot be observed due to the second marker from being generated in the ultrasound image obtained by the transducer.

The ultrasound catheter may further include a covering tube that is disposed on an outer circumferential surface of the outer sheath and covers the distal end marker, and at least a part of the covering tube may be fixed to the outer sheath. Accordingly, the marker identification portion is not exposed to outside, and it is possible to prevent the marker identification portion from rubbing against an inner wall of a blood vessel and damaging the inner wall of the blood vessel and to prevent the marker identification portion from falling off.

A surface of the marker identification portion facing the transducer and an ultrasound emission surface of the transducer may be parallel to the axial center of the outer sheath. Accordingly, it is easy to identify a direction in which the marker identification portion is present in the ultrasound image obtained from the transducer.

A surface of the marker identification portion facing the axial center of the outer sheath may be subjected to a surface roughening treatment. Accordingly, more ultrasound can be reflected, and a strong white color can be formed more clearly in the ultrasound image. Therefore, in the ultrasound image obtained from the transducer, the direction in which the marker identification portion is present can be easily identified by the white color formed by the surface roughening treatment.

The control unit may receive a signal from the transducer via the drive unit, generate a three-dimensional image of a living tissue, display the three-dimensional image on the display unit, and display the mark indicating the direction of the marker identification portion identified from the two-dimensional ultrasound image on the display unit together with the three-dimensional image of the living tissue. Accordingly, the ultrasound catheter system allows an operator to easily identify a direction of the three-dimensional image of the living tissue acquired by the transducer rotating in the outer sheath.

The control unit may generate a three-dimensional model image indicating a simple shape of a human body on three-dimensional coordinates different from the three-dimensional image of the living tissue, synchronize directions of the three-dimensional image of the living tissue and the three-dimensional model image, and display the three-dimensional image of the living tissue and the three-dimensional model image on the display unit. Accordingly, since an operator can observe a three-dimensional image of a living tissue of an observed tissue while comparing the three-dimensional image with the three-dimensional model image, it is possible to easily identify a direction in a body of the three-dimensional image of the living tissue.

When information for changing the direction of the three-dimensional image of the living tissue or the three-dimensional model image on the display unit is received from the input unit, the control unit may change the directions of the three-dimensional image of the living tissue and the three-dimensional model image in synchronization with each other and display the three-dimensional image of the living tissue and the three-dimensional model image on the display unit. Accordingly, an operator can synchronize the directions of the three-dimensional image of the living tissue and the three-dimensional model image and adjust the directions into a direction that is easy to view, and thus can easily identify a direction in a body of the three-dimensional image of the living tissue.

A method is disclosed for acquiring an image in a lumen of a living body, the method comprising: inserting an ultrasound catheter into the lumen of the living body, the ultrasound catheter including an outer sheath including an accommodation lumen extending from a proximal end to a distal end of the outer sheath, a drive shaft configured to be movable in the outer sheath along an axial center of the outer sheath, a transducer disposed in the accommodation lumen and fixed to a distal end of the drive shaft, the transducer configured to transmit and receive ultrasound, and a radiopaque distal end marker disposed at a distal end portion of the outer sheath, wherein the distal end marker includes a marker identification portion extending along the axial center on a part in a circumferential direction of the distal end marker, and a marker comparison portion formed in a circumferential direction or a radial direction of the outer sheath, the marker comparison portion having one or more of a length and an arrangement different from that of the marker identification portion; acquiring image data from the transducer of the ultrasound catheter; and displaying the acquired image data on a display unit.

BRIEF DESCRIPTION OF THE DRAWINGS

FIGS. 2A and 2B are cross-sectional views of a transducer of the ultrasound catheter, in which FIG. 2A shows a distal end portion and FIG. 2B shows a proximal end portion.

FIGS. 4A and 4B show a marker identification portion and a marker comparison portion, in which FIG. 4A shows a definition of an angle viewed from a distal end side, and FIG. 4B is a side view at each angle.

FIGS. 7A and 7B are schematic diagrams showing a two-dimensional ultrasound image generated by the ultrasound catheter system, in which FIG. 7A shows a state before a display angle is changed, and FIG. 7B shows a state after the display angle is changed.

FIG. 10 is a flowchart showing a flow of control in a control unit.

FIGS. 11A to 11C show modifications of the ultrasound catheter, in which FIG. 11A shows a first modification, FIG. 11B shows a second modification, and FIG. 11C shows a third modification.

FIGS. 12A and 12B show modifications of the ultrasound catheter, in which FIG. 12A shows a fourth modification, and FIG. 12B shows a fifth modification.

FIGS. 13A to 13C show modifications of the ultrasound catheter, in which FIG. 13A shows a sixth modification, FIG. 13B shows a seventh modification, and FIG. 13C shows an eighth modification.

FIGS. 14A and 14B show modifications of the ultrasound catheter, in which FIG. 14A shows a ninth modification, and FIG. 14B shows a tenth modification.

FIGS. 15A and 15B show modifications of the ultrasound catheter, in which FIG. 15A shows an eleventh modification, and FIG. 15B shows a twelfth modification.

DETAILED DESCRIPTION

Figure 1:
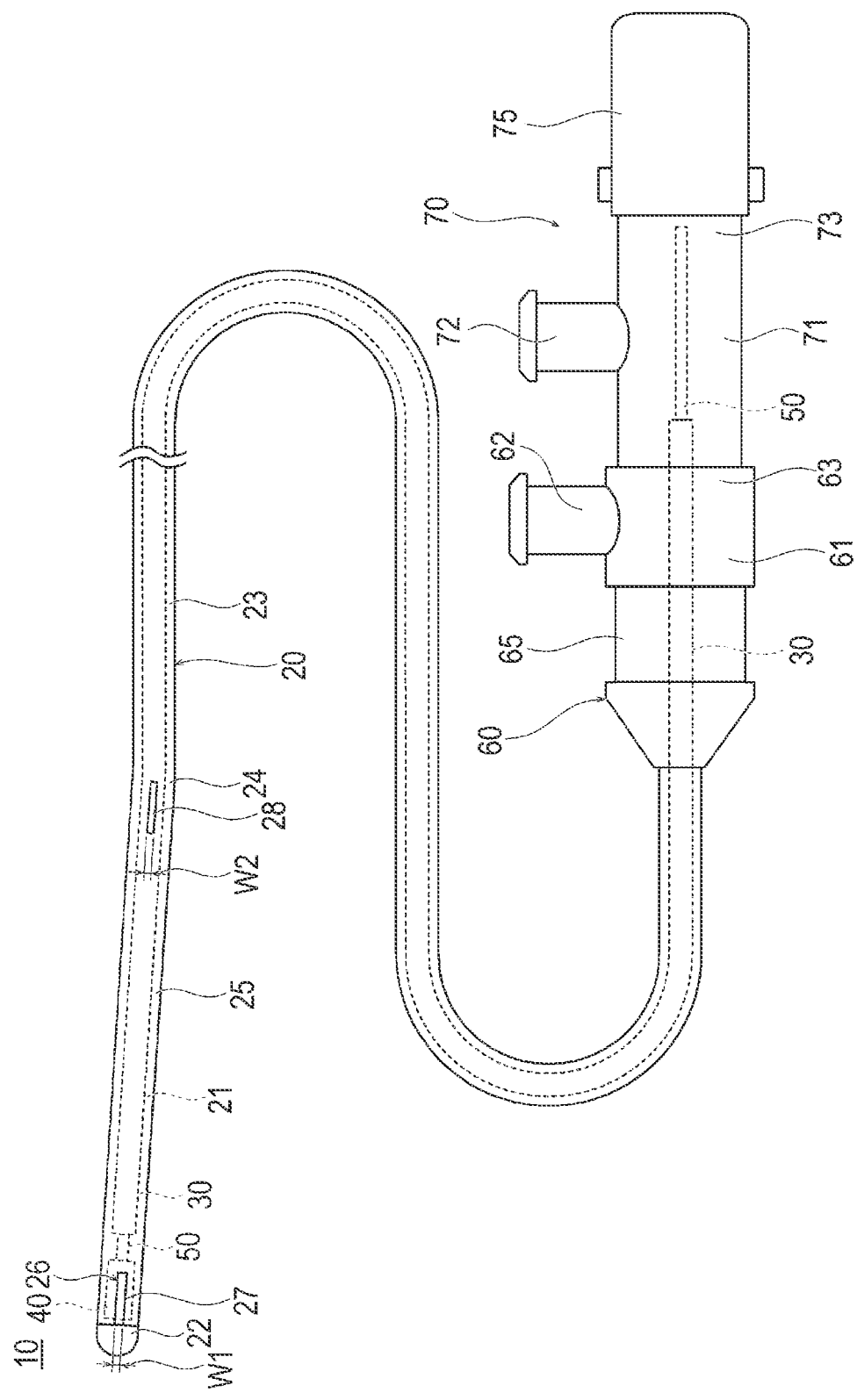
FIG. 1 is a plan view showing an ultrasound catheter.

Set forth below with reference to the accompanying drawings is a detailed description of embodiments of an ultrasound catheter and an ultrasound catheter system that acquire an image by insertion into a lumen such as a heart or a blood vessel. Note that since embodiments described below are preferred specific examples of the present disclosure, although various technically preferable limitations are given, the scope of the present disclosure is not limited to the embodiments unless otherwise specified in the following descriptions. For convenience of description, dimensional ratios in the drawings may be exaggerated and may be different from actual ratios. In addition, in the specification, a side to be inserted into a living body is referred to as a "distal end side", and a side to be operated is referred to as a "proximal end side".

Figure 3:
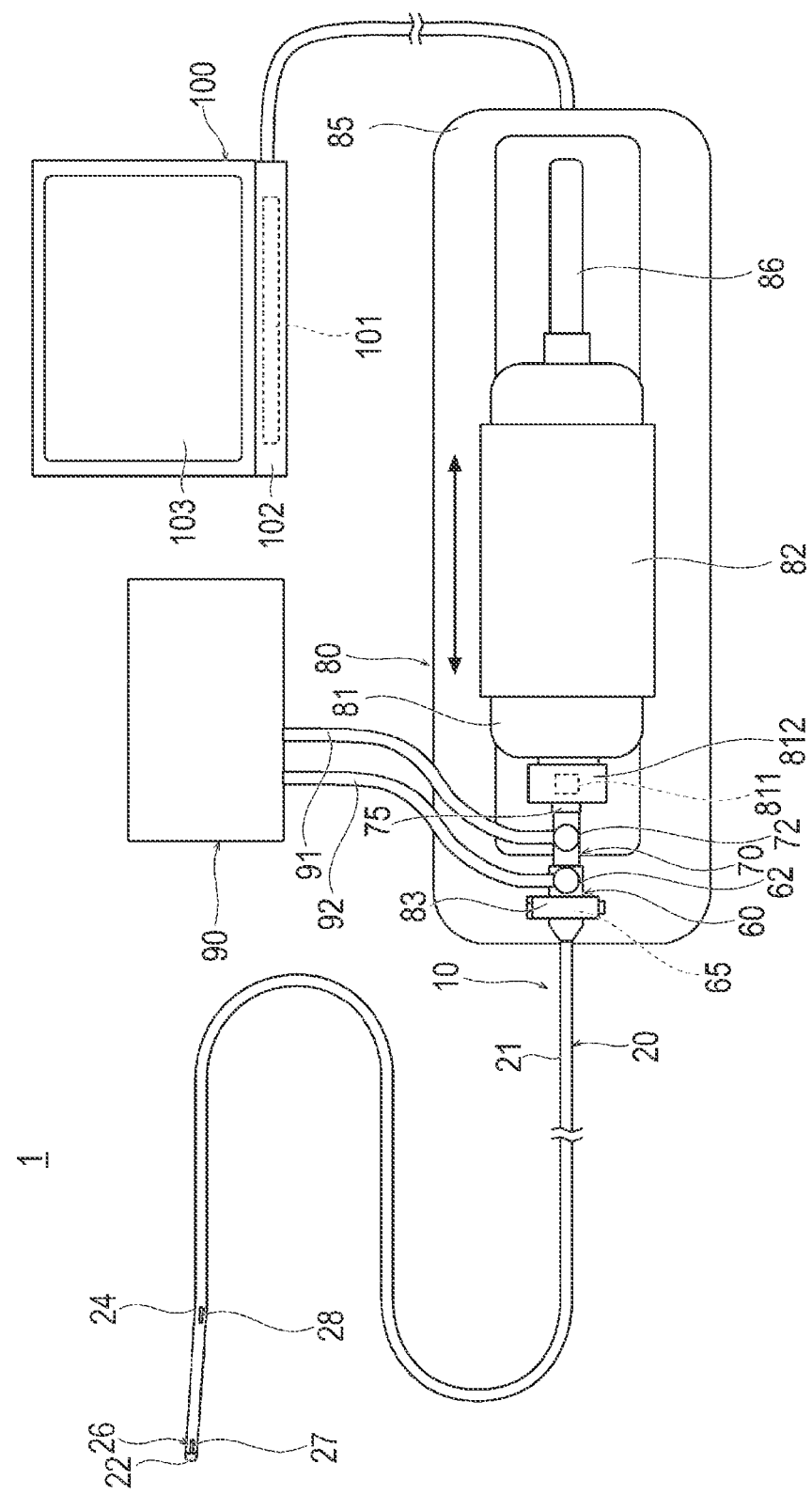
FIG. 3 is a schematic diagram showing an ultrasound catheter system including the ultrasound catheter.

As shown in FIG. 3, an ultrasound catheter system 1 according to an embodiment is a system that acquires a transvascular ultrasound image by an ultrasound catheter 10 inserted into a heart or a blood vessel, and displays the acquired ultrasound image such that a direction in a body of the ultrasound image can be rather easily identified. The ultrasound catheter system 1 includes the ultrasound catheter 10, a drive unit 80, a pump device 90, and a control device 100.

As shown in FIGS. 1, 2A, and 2B, the ultrasound catheter 10 includes an outer sheath 20, a distal end marker 26, a second marker 28, an inner sheath 30, a transducer unit 40, and a drive shaft 50. The ultrasound catheter 10 further includes a first housing 60 and a second housing 70.

The outer sheath 20 is a tubular member to be inserted into a lumen of a living body. The outer sheath 20 can include, from a proximal end toward a distal end, a proximal end side tubular portion 23, a bent portion 24, and a distal end side tubular portion 25. An accommodation lumen 21 penetrating the outer sheath 20 from the proximal end to the distal end is formed inside the proximal end side tubular portion 23, the bent portion 24, and the distal end side tubular portion 25.

The proximal end side tubular portion 23 is a tubular member having a substantially linear axial center. A proximal end portion of the proximal end side tubular portion 23 can be fixed to the first housing 60. An axial center of at least a distal end portion of the proximal end side tubular portion 23 is located on a linear reference line X. The bent portion 24 is a tubular member that is located on the distal end side of the proximal end side tubular portion 23 and has a bent axial center. The distal end side tubular portion 25 is a tubular member that is located on the distal end side of the bent portion 24 and has a linear axial center. A distal end portion of the distal end side tubular portion 25 is fixed to a distal end cap 22.

A bending angle θ of the bent portion 24 is not particularly limited, and can be, for example, preferably 10° to 40°. If the bending angle θ is too small, an offset amount L2 of a distal end portion of the outer sheath 20 with respect to a proximal end portion of the outer sheath 20 is small. The offset amount L2 is a length from the reference line X to an axial center of a portion farthest from the reference line X in a direction perpendicular to the reference line X among portions of the outer sheath 20 on the distal end side of the bent portion 24. If the bending angle θ is too large, rotation and movement in an axial center direction of the drive shaft 50, which moves in the axial center direction while rotating in a state of being bent inside the bent portion 24, are likely to be hindered. In contrast, when the bending angle θ has an appropriate value, it is rather easy to set the offset amount L2 of the outer sheath 20 to a desired value while stably maintaining the rotation and the movement in the axial center direction of the drive shaft 50.

A distal end portion length L1, which is a length along the reference line X from a boundary between the proximal end side tubular portion 23 and the bent portion 24 to a leading distal end of the outer sheath 20, is not particularly limited, and can be, for example, preferably 20 mm to 150 mm. Therefore, it is possible to appropriately set a length of a portion of the outer sheath 20 offset on the distal end side of the bent portion 24 (a portion whose axial center is displaced from the reference line X in a direction perpendicular to the reference line X) along the reference line X so as to use the ultrasound catheter in a heart or a blood vessel having a wide lumen. In addition, when the distal end portion length L1 is too small, the offset amount L2 of the distal end portion of the outer sheath 20 with respect to the proximal end portion of the outer sheath 20 tends to be small. If the distal end portion length L1 is too large, the offset amount L2 of the distal end portion of the outer sheath 20 with respect to the proximal end portion of the outer sheath 20 tends to be large. In contrast, when the distal end portion length L1 is an appropriate length, it is rather easy to set the offset amount L2 of the outer sheath 20 to a desired value.

The offset amount L2 is not particularly limited, and can be, for example, preferably 5 mm to 30 mm. When the offset amount L2 has an appropriate value, it is easy to bring the outer sheath 20 close to a site to be observed in the heart or the blood vessel having a wide lumen.

In the outer sheath 20, the transducer unit 40, the inner sheath 30, and the drive shaft 50 are accommodated in an accommodation lumen 21. The transducer unit 40, the inner sheath 30, and the drive shaft 50 in the outer sheath 20 are movable in the accommodation lumen 21 along an axial center of the outer sheath 20. Further, the transducer unit 40 and the drive shaft 50 in the outer sheath 20 are rotatable inside the outer sheath 20. The outer sheath 20 is a cylindrical member having a proximal end that is open and a distal end that is closed by the distal end cap 22. The proximal end portion of the proximal end side tubular portion 23 forming the proximal end portion of the outer sheath 20 can be fixed to the first housing 60. The distal end portion of the distal end side tubular portion 25 forming the distal end portion of the outer sheath 20 is fixed to the distal end cap 22 that is a part of the distal end marker 26. The proximal end portion of the outer sheath 20 may be provided with a reinforcing member such as a braided braid wire.

In the embodiment, one bent portion 24 is provided, however, the bent portion 24 may not be provided or two or more bent portions 24 may be provided.

The distal end marker 26 is fixed to a portion on the distal end side of the outer sheath 20 in a circumferential direction. The distal end marker 26 can contain a radiopaque material. The distal end marker 26 includes the distal end cap 22 and a marker identification portion 27 extending linearly along the axial center of the outer sheath 20.

The distal end cap 22 is a member that closes the opening on the distal end side of the outer sheath 20. The distal end cap 22 can contain a radiopaque material. A guide wire lumen may be formed in the distal end cap 22. In this case, the ultrasound catheter 10 can be a rapid exchange type ultrasound catheter including a guide wire lumen at a distal end portion of the catheter 10. As will be described later, the distal end cap 22 functions as a marker comparison portion to be compared with the marker identification portion 27. In addition, the distal end cap 22 may be formed with an opening through which a fluid inside the outer sheath 20 can be discharged to outside. The distal end cap 22 may contain no radiopaque material and may not function as a marker.

At least a portion of the marker identification portion 27 is disposed on the proximal end side of the distal end cap 22. In the embodiment, a distal end of the marker identification portion 27 is disposed at substantially the same position as a proximal end of the distal end cap 22 in an axial center direction of the outer sheath 20. The marker identification portion 27 is disposed on an outer circumferential surface, an inner circumferential surface, or inside a material of the outer sheath 20.

The marker identification portion 27 is formed to be shorter in the circumferential direction and shorter in a radial direction than the distal end cap 22 that is the marker comparison portion. A width W1 of the marker identification portion 27 in the circumferential direction of the outer sheath 20 is not particularly limited, and can be preferably, for example, 0.5 mm to 0.8 mm. Accordingly, the marker identification portion 27 can be identified by X-ray imaging and can be identified by a two-dimensional or three-dimensional ultrasound image obtained by a transducer 41. The marker identification portion 27 extends in the axial center direction of the outer sheath 20 by a predetermined length. Therefore, since a range in which the marker identification portion 27 can be observed by the transducer 41 is secured in the axial center direction of the outer sheath 20, the marker identification portion 27 can be reliably identified from the ultrasound image obtained by the transducer 41.

Figure 4A:
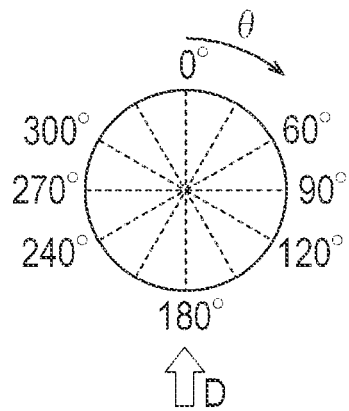
Figure 4B:
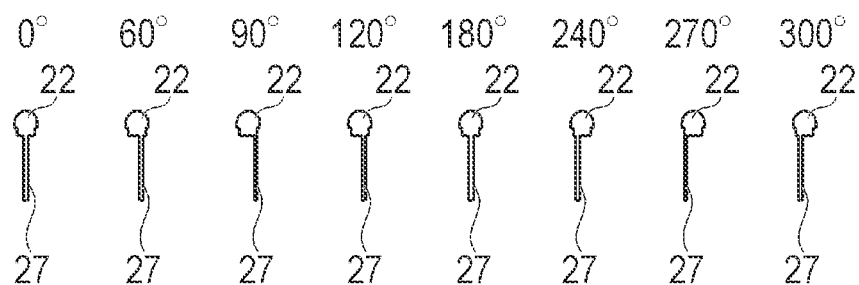

Since the marker identification portion 27 is fixed to a part of the outer sheath 20 in the circumferential direction, a position of the marker identification portion 27 in the circumferential direction changes when the outer sheath 20 rotates about the axial center. For example, as shown in FIG. 4A, the marker identification portion 27 can be disposed at a position rotated by any angle α clockwise from a position of 0° which is a reference when viewed from the distal end side. Shapes of the distal end cap 22 (marker comparison portion) and the marker identification portion 27 observed by X-ray imaging from one direction D on an outer side in a radial direction of the outer sheath 20 change according to the angle α as shown in FIG. 4B. At this time, the shape of the distal end cap 22 (marker comparison portion) having an unbiased shape in the circumferential direction hardly changes, whereas the shape of the marker identification portion 27 disposed only in a part in the circumferential direction changes. Therefore, an operator can identify a direction to which the marker identification portion 27 of the outer sheath 20 faces by observing a relative position of the marker identification portion 27 with respect to the marker comparison portion based on an image obtained by X-ray imaging. It is difficult to identify a positional relationship of members in a depth direction only based on the image obtained by X-ray imaging, and for example, an image in the case of 0° and an image in the case of 180° are similar to each other. In addition, for example, an image in the case of 60° and an image in the case of 120°, and an image in the case of 240° and an image in the case of 300° are similar to each other. However, since the operator can observe the X-ray image while performing an operation of rotating the outer sheath 20 in the circumferential direction, the operator can also identify a position in the depth direction of the angle α by observing the X-ray image within a predetermined angle range including the angle α to be identified. Therefore, the operator can distinguish, for example, X-ray images at 0° and 180°, X-ray images at 60° and 120°, and X-ray images at 240° and 300°, which are similar to each other.

The second marker 28 is disposed at the same position as or adjacent to the bent portion 24 in the axial center direction of the outer sheath 20. The second marker 28 is fixed to a part of the outer sheath 20 in the circumferential direction. A width W2 of the second marker 28 in the circumferential direction is not particularly limited, and can be preferably 0.2 to mm 0.5 mm, for example. Accordingly, since the second marker 28 is sufficiently thin, the second marker 28 is less likely to interfere with acquisition of an ultrasound image through the outer sheath 20 from inside of the outer sheath 20.

As shown in FIGS. 1, 2A, and 2B, the inner sheath 30 is a cylindrical member whose one part on the distal end side is inserted into the outer sheath 20. The part on the distal end side of the inner sheath 30 is accommodated inside the outer sheath 20 so as to be movable along the axial center of the outer sheath 20. A proximal end portion of the inner sheath 30 extends from the outer sheath 20 and the first housing 60 to the proximal end side, and can be fixed to the second housing 70.

The inner sheath 30 rotatably accommodates the drive shaft 50. A distal end portion of the inner sheath 30 is located close to the transducer unit 40 on the proximal end side of the transducer unit 40. The inner sheath 30 is disposed between the inner circumferential surface of the outer sheath 20 and an outer circumferential surface of the drive shaft 50 so as to stabilize movement of the drive shaft 50 in a rotation direction and an axial direction.

The transducer unit 40 transmits and receives ultrasound to and from a living tissue in a body. The transducer unit 40 includes the transducer 41 that transmits and receives ultrasound, and a transducer holding portion 42 in which the transducer 41 is disposed and which is fixed to the drive shaft 50. The transducer unit 40 is movable in the axial center direction of the outer sheath 20 beyond the bent portion 24 in the accommodation lumen 21 of the outer sheath 20. In addition, the transducer unit 40 is rotatable around an axial center in the accommodation lumen 21.

Constituent materials from which the outer sheath 20 and the inner sheath 30 are fabricated are not particularly limited as long as the materials are flexible and have a certain degree of strength. For example, the constituent materials for the outer sheath 20 and the inner sheath 30 can be a polyolefin such as polyethylene and polypropylene, polyester such as polyamide and polyethylene terephthalate, fluorine-based polymer such as polytetrafluoroethylene (PTFE) and copolymer of ethylene and tetrafluoroethylene (ETFE), polyether ether ketone (PEEK), and polyimide.

In the distal end cap 22, a radiopaque material may be mixed with a material that can be used for the outer sheath 20 and the inner sheath 30 described above. Examples of the radiopaque material can include barium sulfate, bismuth oxide, tungsten, gold, platinum, and tantalum.

The drive shaft 50 transmits a rotational force and a moving force in the axial center direction, which are applied from the drive unit 80 (see FIG. 3), to the transducer unit 40. The drive shaft 50 includes a flexible distal end side drive shaft 51 passing through the inner sheath 30, and a connection pipe 52 fixed to a proximal end portion of the distal end side drive shaft 51. A distal end of the distal end side drive shaft 51 is fixed to the transducer holding portion 42. The distal end side drive shaft 51 can be formed of, for example, a multilayer coil-shaped tubular member such as a three-layer coil in which right, left, and right winding directions are alternately arranged. The connection pipe 52 can be, for example, a circular pipe made of metal. A proximal end portion of the connection pipe 52 is fixed to a rotor 77 that rotates inside the second housing 70.

When the drive shaft 50 transmits power of rotation, the transducer unit 40 rotates, and an internal structure of a tissue can be observed 360 degrees from a blood vessel or a cardiac cavity. In addition, the drive shaft 50 is movable along the axial center of the outer sheath 20 in the accommodation lumen 21 of the outer sheath 20.

A signal line 53 passes through inside of the drive shaft 50. The signal line 53 transmits a signal transmitted from the rotor 77 to the transducer unit 40. In addition, the signal line 53 transmits a signal detected by the transducer unit 40 to the drive unit 80 via the rotor 77.

In the first housing 60, the proximal end portion of the outer sheath 20 is fixed in a liquid-tight manner. The first housing 60 can include a first port 62 communicating with a lumen of the outer sheath 20, and a first sealing portion 64.

A first hollow portion 61 communicates with the first port 62 and the accommodation lumen 21 of the outer sheath 20. The inner sheath 30 and the drive shaft 50, which extent from the outer sheath 20 toward the proximal end side, pass through the first hollow portion 61. A first housing proximal end portion 63 can include a through hole communicating with the first hollow portion 61, and can be located on the proximal end side of the first hollow portion 61. The first sealing portion 64 is disposed in the through hole of the first housing proximal end portion 63. The inner sheath 30 and the drive shaft 50 pass through the first sealing portion 64. The first sealing portion 64 is in contact with the first housing proximal end portion 63 in a liquid-tight manner. The first sealing portion 64 is in contact with an outer circumferential surface of the inner sheath 30 so as to be slidable and rotatable along an axial center of the inner sheath 30. The first sealing portion 64 is not particularly limited as long as the first sealing portion 64 can slide on the outer circumferential surface of the inner sheath 30, and can be, for example, an O-ring or a cross-cut valve member.

The first housing 60 is rotatably supported with respect to a distal end side support portion 83 of the drive unit 80, which will be described later.

The second housing 70 is disposed on the proximal end side of the first housing 60. In the second housing 70, the proximal end portion of the inner sheath 30 extends from the first housing 60 toward the proximal end side in a liquid-tight manner. The second housing 70 can approach and separate from the first housing 60 along the axial center of the inner sheath 30.

The second housing 70 includes a second hollow portion 71 communicating with a lumen of the inner sheath 30, a second port 72, a second housing proximal end portion 73, and a second sealing portion 74. The second housing 70 further includes a joint 75, a connector 76, and the rotor 77.

The second hollow portion 71 allows the second port 72 and the lumen of the inner sheath 30 to communicate with each other. The drive shaft 50 extends from the inner sheath 30 toward the proximal end side passes through the second hollow portion 71. The second housing proximal end portion 73 includes a through hole communicating with the second hollow portion 71, and is located on the proximal end side of the second hollow portion 71. The second sealing portion 74 is disposed in the through hole of the second housing proximal end portion 73. The connection pipe 52 of the drive shaft 50 passes through the second sealing portion 74. The second sealing portion 74 is in contact with an outer circumferential surface of the connection pipe 52 so as to be slidable in a rotation direction of the connection pipe 52. The second sealing portion 74 slidably seals a space between the second housing proximal end portion 73 and the drive shaft 50. The second sealing portion 74 is not particularly limited as long as the second sealing portion 74 can slide on the outer circumferential surface of the drive shaft 50, and can be, for example, an O-ring. The second port 72 is an opening to which a tube or the like for injecting or draining a fluid such as a saline solution can be connected.

The joint 75 is fixed to the proximal end side of the second housing proximal end portion 73. The joint 75 includes a joint opening portion 751 on the proximal end side, and the connector 76 and the rotor 77 are disposed in joint opening portion 751 of the joint 75. The connector 76 is connectable to a drive connector 811 of the drive unit 80 (see FIG. 3) which enters from the joint opening portion 751. The connector 76 is mechanically and electrically connected to the drive connector 811. The signal line 53 passing through inside of the connection pipe 52 is connected to the connector 76. Therefore, the connector 76 is connected to the transducer unit 40 via the signal line 53.

The connection pipe 52 is fixed to the rotor 77. The rotor 77 rotates integrally with the connector 76 inside the joint 75. When the rotor 77 rotates, the drive shaft 50 fixed to the rotor 77 rotates. In addition, the rotor 77 is interposed between the joint 75 and the second housing proximal end portion 73, and thus movement of the rotor 77 in an axial direction can be limited. The rotor 77 is rotatable inside the second housing 70 and is movable along an axial center together with the second housing 70. The transducer unit 40 outputs ultrasound in response to a signal received via the connector 76 and the signal line 53. In addition, the transducer unit 40 receives reflected ultrasound, converts the reflected ultrasound into a signal, and transmits the signal to the drive unit 80 via the signal line 53 and the connector 76. The drive unit 80 performs appropriate processing on the received signal and displays the processed signal as an image.

A constituent material for fabrication of the first housing 60 and the second housing 70 is not particularly limited as long as the material has a certain degree of strength. For example, polycarbonate, polyamide, polysulfone, polyarylate, or methacrylate-butylene-styrene copolymer can be suitably used as the constituent material of the first housing 60 and the second housing 70.

As shown in FIG. 3, the drive unit 80 includes, on a base 85, a drive portion 81 in which a drive source such as a motor is provided so as to rotationally drive the drive shaft 50, a moving portion 82 that moves the drive portion 81 in an axial direction, and the distal end side support portion 83 that rotatably supports an engagement portion 65 of the ultrasound catheter 10. The drive unit 80 is connected to the control device 100 that controls the drive portion 81 and the moving portion 82. In addition, the drive unit 80 transmits a signal between the control device 100 and the transducer unit 40.

The moving portion 82 can hold and fix the drive portion 81. The moving portion 82 can be, for example, a feed mechanism driven by a drive source such as a motor. The moving portion 82 moves the fixed drive portion 81 forward and backward along a groove rail 86 on the base 85.

The drive portion 81 includes the drive connector 811 that can be connected to the connector 76 of the ultrasound catheter 10, and a proximal end side support portion 812 that can be connected to the joint 75 of the ultrasound catheter 10. When the connector 76 is connected to the drive connector 811, the drive portion 81 can transmit and receive a signal to and from the transducer unit 40, and can rotate the drive shaft 50.

Ultrasound scanning in the ultrasound catheter 10 is performed by transmitting a rotational motion of the drive portion 81 to the drive shaft 50 and rotating the transducer unit 40 fixed to a distal end of the drive shaft 50. Accordingly, ultrasound transmitted and received by the transducer 41 can be scanned substantially in a radial direction. Further, the drive shaft 50 can be pulled toward the proximal end side by the moving portion 82. Accordingly, the transducer 41 can be rotated and moved toward the proximal end side of the catheter 10. Therefore, a 360° cross-sectional image of a blood vessel or a surrounding tissue of a cardiac cavity can be obtained by scanning along the axial center of the outer sheath 20 to any position as desired.

The pump device 90 can circulate a fluid into the ultrasound catheter 10. The pump device 90 includes a supply pipe 91 that supplies the fluid and a recovery pipe 92 that recovers the fluid. The supply pipe 91 is connected to the second port 72. The recovery pipe 92 is connected to the first port 62. A pump mechanism of the pump device 90 is not particularly limited, and can be, for example, a peristaltic pump, a centrifugal pump, or a diaphragm pump. The pump device 90 may also be a non-circulation type pump. In this case, the first port 62 is connected to a tube connected to a waste container. In addition, the pump device 90 may not be provided.

Figure 5:
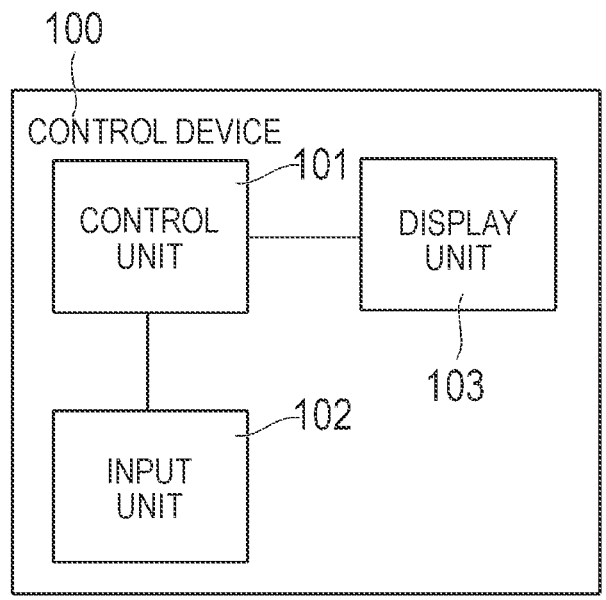
FIG. 5 is a block diagram showing a control device.

As shown in FIGS. 3 and 5, the control device 100 is a device that controls an operation of the drive unit 80 of the ultrasound catheter system 1, conversion of a signal obtained by the ultrasound catheter 10 into image data, display of the image data on a display unit 103, input of an instruction by the operator, and the like. The control device 100 can include a control unit 101, an input unit 102, and the display unit 103. The control device 100 may further have other functions. The control device 100 can be, for example, a computer.

The control unit 101 can include a storage circuit and an arithmetic circuit. The storage circuit stores programs and various parameters. The arithmetic circuit can be, for example, a central processing unit (CPU), and can read programs and various parameters from the storage circuit so as to perform arithmetic processing.

The control unit 101 can control operations of the drive portion 81 and the moving portion 82 of the drive unit 80.

In addition, the control unit 101 can convert an electric signal obtained from the transducer 41 of the ultrasound catheter 10 via the drive unit 80 into image data that can be displayed as an image on the display unit 103, and can transmit the image data to the display unit 103 so as to display the image data. In addition, the control unit 101 can modify or change the image data to be displayed on the display unit 103 based on an instruction signal from the input unit 102 input by the operator, and can display the modified or changed image data on the display unit 103.

The display unit 103 is a monitor capable of displaying a visually recognizable image. The display unit 103 is connected to the control unit 101 so as to be capable of receiving the signal including the image data from the control unit 101. The displayed image can be a two-dimensional ultrasound image acquired by the ultrasound catheter 10, a three-dimensional image of a living tissue generated based on the two-dimensional ultrasound image, a three-dimensional model image simply representing an entire human body, or the like. The display unit 103 displays the image based on the image data received from the control unit 101.

The input unit 102 can include, for example, a keyboard, a mouse, a microphone, and a media reading device. The input unit 102 is connected to the control unit 101 so as to be capable of transmitting, for example, information input by the operator.

Figure 6:
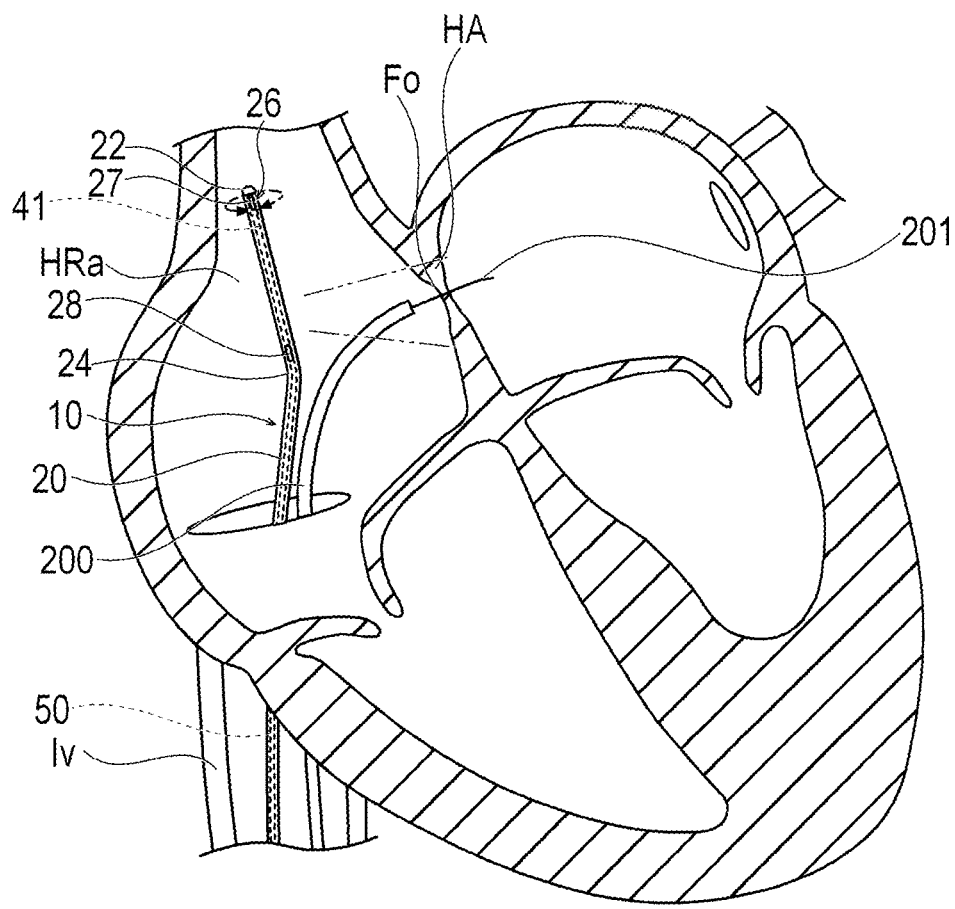
FIG. 6 is a schematic diagram showing an example of use of the ultrasound catheter system according to the embodiment.

Next, a method of using the ultrasound catheter system 1 according to the embodiment will be described with reference to a flowchart shown in FIG. 10. Here, as shown in FIG. 6, a procedure in which the ultrasound catheter 10 is inserted from a femoral vein into a right atrium HRa and punctures an atrial septum HA will be described as an example.

First, before the ultrasound catheter 10 is inserted into a blood vessel, as shown in FIG. 3, the supply pipe 91 of the pump device 90 is connected to the second port 72, and the recovery pipe 92 is connected to the first port 62.

Next, the pump device 90 is driven to inject, for example, a saline solution into the second hollow portion 71 from the second port 72 of the second housing 70. Accordingly, as indicated by a dash-dotted line in FIGS. 2A and 2B, the saline solution flows into a gap between the drive shaft 50 and the inner sheath 30, moves to the distal end side, and reaches the distal end side beyond the inner sheath 30. Accordingly, a space between the outer sheath 20 and the transducer unit 40 is filled with the saline solution. Next, the saline solution flows into a gap between the outer sheath 20 and the inner sheath 30 from the distal end side of the inner sheath 30, and moves to the proximal end side. Thereafter, the saline solution is discharged from the first port 62 of the first housing 60. Accordingly, air inside the ultrasound catheter 10 is removed, and a periphery of the transducer unit 40 is filled with the saline solution. Thereafter, circulation of the saline solution is continued or stopped by the pump device 90, and the ultrasound catheter 10 is inserted into a living body lumen. Instead of the pump device, a syringe may be used to manually perform the operation of filling the saline solution described above.

Thereafter, as shown in FIG. 3, the first housing 60 of the ultrasound catheter 10 is connected to the distal end side support portion 83 of the drive unit 80. Next, the joint 75 of the ultrasound catheter 10 is connected to the proximal end side support portion 812 of the drive portion 81. Accordingly, signals can be transmitted and received between the transducer unit 40 and the drive unit 80. Further, the drive shaft 50 is rotatable about an axial center and movable along the axial center by the drive portion 81 and the moving portion 82.

Next, the operator percutaneously inserts the ultrasound catheter 10 into the femoral vein. Then, as shown in FIG. 6, under observation with X-rays, the operator pushes forward the ultrasound catheter 10 inserted into the blood vessel so as to reach the right atrium HRa via an inferior vena cava Iv. The operator disposes a leading distal end of the ultrasound catheter 10 at a position beyond a fossa ovalis Fo to be observed (on a side closer to a superior vena cava than the fossa ovalis Fo). In addition, the operator percutaneously inserts a sheath 200 into the femoral vein so as to reach the right atrium HRa via the inferior vena cava Iv.

Next, the operator adjusts an overall position of the ultrasound catheter 10 such that the second marker 28 of the outer sheath 20 is in the vicinity of the fossa ovalis Fo. Since the second marker 28 is provided on the bent portion 24, the operator can rather easily dispose a portion of the outer sheath 20 where the second marker 28 is provided at a desired position by observing an X-ray image. In addition, since the bent portion 24 is provided in the ultrasound catheter 10, the operator can rather easily adjust a position of the transducer 41 to any distance and angle desirable for observing the fossa ovalis Fo by rotating the outer sheath 20.

The operator observes the distal end cap 22 and the distal end marker 26 in the X-ray image, and adjusts the marker identification portion 27 such that the marker identification portion 27 faces, for example, a ventral side (front side) of a patient. That is, the operator adjusts a position of the outer sheath 20 such that the shapes of the marker comparison portion and the marker identification portion 27 observed in the X-ray image form a substantially T-shape in which the marker identification portion 27 is located in a direction of the angle α=0° in FIG. 4B. Since it is sufficient that an orientation relationship between the marker identification portion 27 and a body can be identified, the direction to which the marker identification portion 27 faces is not limited to the ventral side of the patient, and may also be, for example, a back side of the patient.

Next, the ultrasound catheter 10 is connected to the drive unit 80, and as shown in FIGS. 1, 2A, and 2B, the second housing 70 is brought closest to the first housing 60. Accordingly, the transducer 41 is disposed in the vicinity of the distal end of the outer sheath 20. Therefore, the transducer 41 is disposed in a range in which the marker identification portion 27 can be observed by rotating. The position of the transducer 41 may be arranged in advance in the vicinity of the distal end of the outer sheath 20.

Figure 7A:
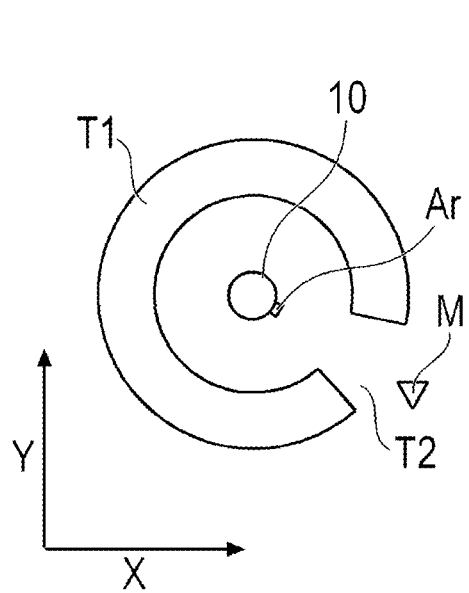

Next, the operator operates the input unit 102 to acquire image data from the transducer 41 and display the image data on the display unit 103. The control device 100 operates the drive unit 80 to rotate the drive shaft 50 based on an instruction signal received from the input unit 102. Accordingly, the transducer 41 rotates 360° or more, transmits ultrasound along an XY plane orthogonal to the axial center of the outer sheath 20, and receives reflected ultrasound (501). The control device 100 receives a signal via the drive unit 80, generates a two-dimensional ultrasound image of the XY plane orthogonal to the axial center of the outer sheath 20 as in the schematic diagram shown in FIG. 7A (S02), and displays the two-dimensional ultrasound image on the display unit 103 (S03). In the two-dimensional ultrasound image, a living tissue T1 that receives the ultrasound is represented by a strong white color indicating that the ultrasound is strongly reflected, the marker identification portion 27 is represented by a white acoustic artifact Ar extending in a radial direction from an outer circumferential surface of the ultrasound catheter 10, and a living tissue T2 in a range hidden by the marker identification portion 27 from the ultrasound is represented by a strong black color indicating that the ultrasound is hardly reflected. The operator observes the two-dimensional ultrasound image displayed on the display unit 103, and identifies a direction represented by the white acoustic artifact Ar caused by presence of the marker identification portion 27 or the strong black color indicating that there is almost no reflection of the ultrasound. Next, the operator operates the input unit 102 while observing the display unit 103, and registers a mark M in a direction in which the marker identification portion 27 is present. The operator can move the mark M on a screen of the display unit 103 by using, for example, a keyboard or a mouse, and attach the mark M in the direction in which the marker identification portion 27 is present. The control device 100 can store the direction in which the marker identification portion 27 is present based on information input by the operator (S04) and display the mark M (for example, a triangle or an arrow) on the display unit 103 (S05). By identifying and storing the direction in which the marker identification portion 27 is located on the XY plane, the control unit 101 can identify an orientation (the ventral side in the embodiment) of the marker identification portion 27 in the obtained ultrasound image even when the transducer 41 is moved thereafter in an axial center direction and the marker identification portion 27 is disposed at a position where the marker identification portion 27 cannot be observed. The control unit 101 may automatically identify the direction in which the marker identification portion 27 in the two-dimensional ultrasound image on the XY plane is located by image analysis without depending on the input of the mark M by the operator.

Figure 7B:
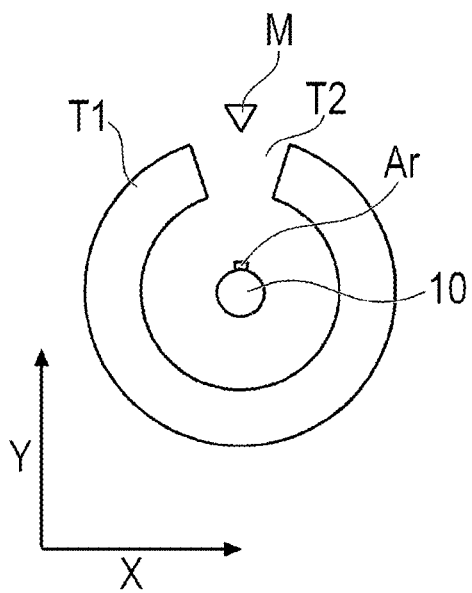

Next, as shown in FIG. 7B, the operator operates the input unit 102 to rotate the two-dimensional ultrasound image displayed on the display unit 103 together with the mark M around an axial center, and adjusts the mark M such that the mark M is directed, for example, upward (toward a 12 o'clock direction on a clock). The control unit 101 displays, on the display unit 103, the rotated two-dimensional ultrasound image based on instruction information input to the input unit 102 (S06). The control unit 101 may automatically rotate the two-dimensional ultrasound image displayed on the display unit 103 around the axial center and display the two-dimensional ultrasound image such that the direction in which the mark M is provided is the 12 o'clock direction, without depending on any instruction given by the operator. This process is optional and may be omitted since the process is a process for the operator to visualize the direction in which the marker identification portion 27 is present.

Figure 8:
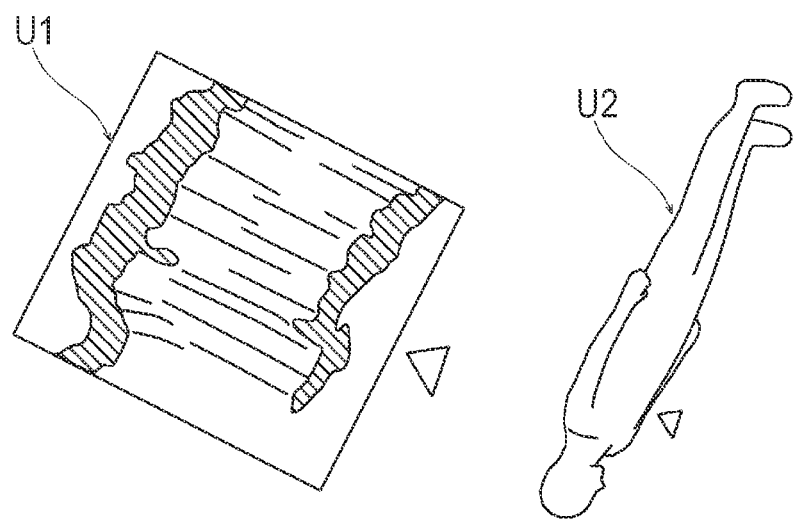
FIG. 8 shows a living tissue three-dimensional image that is generated by the ultrasound catheter system and displayed on a display unit.

Next, the operator operates the input unit 102 to start acquisition of a living tissue three-dimensional image U1 by the transducer 41 as shown in FIG. 8. The control unit 101 operates the drive unit 80 based on the instruction information input to the input unit 102 so as to rotate and pull back the drive shaft 50. The control unit 101 generates the living tissue three-dimensional image U1 by laminating a plurality of two-dimensional ultrasound images obtained from the transducer 41 in a pull-back direction (S07), and displays the living tissue three-dimensional image U1 on the display unit 103 (S08). At this time, since directions of X-axes and Y-axes of the respective two-dimensional ultrasound images are common, the direction of the marker identification portion 27 identified from the two-dimensional ultrasound image (or the living tissue three-dimensional image) before the pull-back can be applied to three-dimensional coordinates as the direction of the marker identification portion 27 in the living tissue three-dimensional image U1 obtained at the time of the pull-back operation. Therefore, the control unit 101 can provide the mark M indicating the direction of the marker identification portion 27 to the living tissue three-dimensional image U1 of a tissue acquired in real time (for example, in the vicinity of the fossa ovalis Fo of the atrial septum HA) and display the living tissue three-dimensional image U1 on the display unit 103. The range hidden by the marker identification portion 27 from the ultrasound is a part where a wall of the living tissue is broken at a lower right part of a paper surface of the three-dimensional image U1 shown in FIG. 8.

Figure 9:
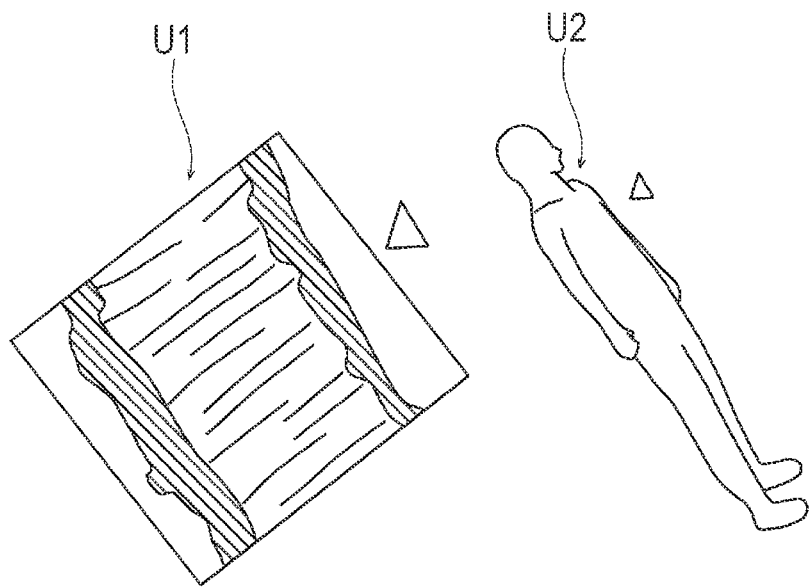
FIG. 9 shows a state in which an angle of the living tissue three-dimensional image that is generated by the ultrasound catheter system and displayed on the display unit is changed.

Further, the control unit 101 generates a simple three-dimensional model image U2 of a human body on three-dimensional coordinates different from three-dimensional coordinates of the living tissue three-dimensional image U1 of the tissue in real time (S09). The control unit 101 can provide the mark M in the direction of the marker identification portion 27 known by X-ray imaging (in the embodiment, the ventral side) and display the mark M on the display unit 103 together with the three-dimensional model image U2. A position of the mark M to be provided on the three-dimensional model image U2 is input from the input unit 102. Then, the control unit 101 synchronizes directions of the living tissue three-dimensional image U1 of the tissue and the three-dimensional model image U2 and displays the living tissue three-dimensional image U1 and the three-dimensional model image U2 on the display unit 103 (S10). That is, the control unit 101 performs display on the display unit 103 such that the direction of the mark M on the living tissue three-dimensional image U1 and the direction of the mark on the three-dimensional model image U2 coincide with each other. For example, when the operator rotates the living tissue three-dimensional image U1 (or the three-dimensional model image U2) of the tissue in real time at any angle in any direction on the display unit 103 by using the input unit 102, the control unit 101 can rotate both the living tissue three-dimensional image U1 and the three-dimensional model image U2 in synchronization with each other and display the living tissue three-dimensional image U1 and the three-dimensional model image U2 on the display unit 103 as shown in FIG. 9 (S11). Therefore, since the operator can observe the living tissue three-dimensional image U1 of the tissue in real time while comparing the living tissue three-dimensional image U1 with the three-dimensional model image U2, it is possible to rather easily identify a direction in the body of the living tissue three-dimensional image U1. Since a hand side (proximal end side) relative to the marker identification portion 27 is displayed in the three-dimensional image U1 shown in FIG. 9, the range hidden by the marker identification portion 27 from the ultrasound is not displayed.

Next, as shown in FIG. 6, the operator reaches a septal puncture needle 201 through the sheath 200 to the right atrium HRa. Next, the operator confirms that the septum puncture needle 201 is directed toward the fossa ovalis Fo under observation of the real time living tissue three-dimensional image U1 observed through the ultrasound catheter 10. Thereafter, the operator punctures the fossa ovalis Fo by the septum puncture needle 201 under the observation of the living tissue three-dimensional image U1 of the tissue in real time. Accordingly, it is possible to reliably prevent a site other than the fossa ovalis Fo from being punctured by the septum puncture needle 201. Thereafter, the operator removes the septum puncture needle 201, the sheath 200, and the ultrasound catheter 10, and completes the procedure.

As described above, the ultrasound catheter 10 according to the embodiment includes: the outer sheath 20 in which the accommodation lumen 21 penetrating the outer sheath 20 from the proximal end to the distal end is formed; the drive shaft 50 movable in the outer sheath 20 along the axial direction of the outer sheath 20; the transducer 41 that is disposed in the accommodation lumen 21 and is fixed to the distal end of the drive shaft 50 so as to transmit and receive ultrasound; and the radiopaque distal end marker 26 disposed at the distal end portion of the outer sheath 20. The distal end marker 26 includes the marker identification portion 27 extending along the axial center on the part in the circumferential direction, and the marker comparison portion formed in the circumferential direction or the radial direction of the outer sheath 20 with a length and/or an arrangement different from that of the marker identification portion 27.

The ultrasound catheter 10 configured as described above can identify the direction to which the marker identification portion 27 disposed in the outer sheath 20 faces inside the body based on relative position information on the marker identification portion 27 with respect to the distal end cap 22 that is the marker comparison portion obtained by X-ray imaging performed from outside of the body, and can identify the direction of the marker identification portion 27 in the ultrasound image based on information on the position of the marker identification portion 27 in the ultrasound image obtained by the transducer 41 in the accommodation lumen 21. Therefore, the ultrasound catheter 10 allows the operator to rather easily identify a predetermined direction, for example, a direction on the ventral side in the body of the patient in the two-dimensional ultrasound image acquired by the transducer 41 moving along the axial center of the outer sheath 20 in the outer sheath 20 and/or the living tissue three-dimensional image generated based on the two-dimensional ultrasound image.

In addition, the ultrasound catheter 10 further includes the distal end cap 22 connected to the distal end of the outer sheath 20. The marker comparison portion is provided on the distal end cap 22, and the marker identification portion 27 extends toward the proximal end side of the outer sheath 20 beyond the proximal end of the distal end cap 22. Accordingly, the direction of the ultrasound image in the body can be identified by the distal end marker 26 and the distal end cap 22. Further, since the distal end cap 22 that is the marker comparison portion is less likely to enter the range in which the transducer 41 can be observed, it is possible to prevent a range that cannot be observed due to the marker comparison portion from being generated in the ultrasound image obtained by the transducer 41.

In addition, the width of the marker identification portion 27 in the circumferential direction of the outer sheath 20 can be, for example, 0.5 mm to 1.5 mm. Accordingly, the marker identification portion 27 can be stably identified by X-ray imaging, and can be stably identified by the ultrasound image obtained by the transducer 41.

In addition, the outer sheath 20 includes one or more bent portions 24 at different positions in the axial center direction, and the radiopaque second marker 28 is disposed on the bent portion 24 of the outer sheath 20 or at a position adjacent to the bent portion 24. Accordingly, in the ultrasound catheter 10, by rotating the outer sheath 20 while observing the second marker 28 by X-ray imaging, a distance and an angle of the transducer 41 in the accommodation lumen 21 with respect to an object to be observed can be adjusted as desired while grasping the position of the bent portion 24. Therefore, the ultrasound catheter 10 can acquire an image of the object to be observed with relatively high accuracy even when the ultrasound catheter 10 is inserted into a wide lumen.

In addition, the width of the second marker 28 in the circumferential direction of the outer sheath 20 can be, for example, 0.2 mm to 0.5 mm. Accordingly, since the second marker 28 has a small influence on the ultrasound image, it is possible to prevent a range that cannot be observed due to the second marker 28 from being generated in the ultrasound image obtained by the transducer 41.

The ultrasound catheter system 1 according to the embodiment includes: the ultrasound catheter 10 described above; the drive unit 80 configured to drive the ultrasound catheter 10; and the control device 100 configured to control the drive unit 80. The drive unit 80 includes the moving portion 82 configured to move the drive shaft 50 along the axial center of the outer sheath under control of the control device 100. The control device 100 includes: the control unit 101 configured to control the moving portion 82; the display unit 103 configured to receive a signal from the control unit 101 and display an image; and the input unit 102 by which information is input from outside and which transmits the information to the control unit 101. The control unit 101 performs control so as to receive a signal from the transducer 41 via the drive unit 80, generate a two-dimensional ultrasound image and/or a three-dimensional image, display the two-dimensional ultrasound image and/or the three-dimensional image on the display unit 103, automatically identify the direction of the marker identification portion 27 in the two-dimensional ultrasound image and/or the three-dimensional image, or identify the direction of the marker identification portion 27 by an input from the input unit 102, and display the mark M indicating the direction of the marker identification portion 27 on the display unit 103 together with the two-dimensional ultrasound image and/or the three-dimensional image. The input from the input unit 102 includes attaching the mark M in the direction in which the marker identification portion 27 is present by moving the mark M on the screen of the display unit 103 by the operator using, for example, a keyboard or a mouse.

The ultrasound catheter system 1 configured as described above can identify the direction of the marker identification portion 27 disposed in the outer sheath 20 based on relative position information on the marker identification portion 27 with respect to the distal end cap 22 (marker comparison portion) obtained by X-ray imaging performed from outside of the body, and can acquire position information on the marker identification portion 27 when acquiring the ultrasound image obtained by the transducer 41 in the accommodation lumen 21. Therefore, the ultrasound catheter system 1 allows the operator to rather easily identify a predetermined direction, for example, a direction on the ventral side in the body of the patient in the two-dimensional ultrasound image acquired by the transducer 41 moving along the axial center of the outer sheath 20 in the outer sheath 20 and/or the living tissue three-dimensional image generated based on the two-dimensional ultrasound image.

In addition, the control unit 101 generates the living tissue three-dimensional image based on the two-dimensional ultrasound image, displays the living tissue three-dimensional image on the display unit 103, and displays the mark M indicating the direction of the marker identification portion 27 identified from the two-dimensional ultrasound image on the display unit 103 together with the living tissue three-dimensional image U1. Accordingly, the ultrasound catheter system 1 allows the operator to rather easily identify the direction of the living tissue three-dimensional image U1 generated based on the two-dimensional ultrasound image acquired by the transducer 41 moving along the axial center in the outer sheath 20.

In addition, the control unit 101 generates the three-dimensional model image U2 indicating the simple shape of the human body on the three-dimensional coordinates different from those of the living tissue three-dimensional image U1, synchronizes the directions of the living tissue three-dimensional image U1 and the three-dimensional model image U2, and displays the living tissue three-dimensional image U1 and the three-dimensional model image U2 on the display unit 103. Accordingly, since the operator can observe the living tissue three-dimensional image U1 of the tissue while comparing the living tissue three-dimensional image U1 with the three-dimensional model image U2, it is possible to rather easily identify a direction in the body of the living tissue three-dimensional image U1.

In addition, when information for changing the direction of the living tissue three-dimensional image U1 or the three-dimensional model image U2 on the display unit 103 is received from the input unit 102, the control unit 101 changes the directions of the living tissue three-dimensional image U1 and the three-dimensional model image U2 in synchronization with each other and display the living tissue three-dimensional image U1 and the three-dimensional model image U2 on the display unit 103. Accordingly, the operator can synchronize the directions of the living tissue three-dimensional image U1 and the three-dimensional model image U2 and adjust the directions into a direction that is easy to view, and thus can rather easily identify a direction in the body of the living tissue three-dimensional image U1.

Figure 11A:
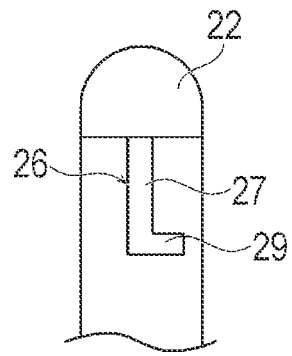
Figure 11B:
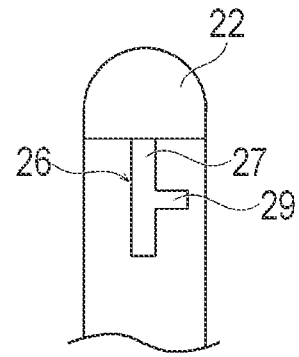
Figure 11C:
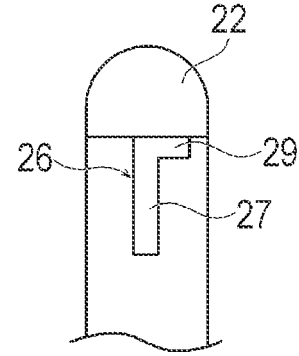

The disclosure is not limited to the above-described embodiment, and various modifications can be made by those skilled in the art within the technical idea of the invention. For example, as in a first modification shown in FIG. 11A, a marker comparison portion 29 may be provided not on the distal end cap 22 but on the distal end marker 26. The marker comparison portion 29 extends from the marker identification portion 27 to one side in the circumferential direction by a predetermined length on a proximal end portion of the distal end marker 26. The marker identification portion 27 and the marker comparison portion 29 may be integrally formed, or may be formed as separate members. Since the length of the marker comparison portion 29 in the circumferential direction is larger than a length of the marker identification portion 27 in the circumferential direction, the operator can identify the direction to which the marker identification portion 27 faces by comparing the position or shape of the marker identification portion 27 with a position or shape of the marker comparison portion 29 based on an X-ray image. Since the marker comparison portion 29 does not extend from the marker identification portion 27 in both directions in the circumferential direction, the operator can identify a positional relationship of the marker identification portion 27 with respect to the marker comparison portion 29 in a depth direction only based on an image obtained by X-ray imaging. The position of the marker comparison portion 29 in the axial center direction with respect to the marker identification portion 27 is not particularly limited. For example, as in a second modification shown in FIG. 11B, the marker comparison portion 29 may extend from a substantially center of the marker identification portion 27 in the axial center direction to one side in the circumferential direction. In addition, as in a third modification shown in FIG. 11C, the marker comparison portion 29 may extend from a distal end portion of the marker identification portion 27 to one side in the circumferential direction.

Figure 12A:
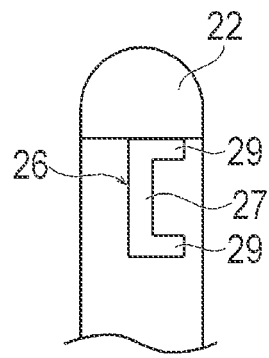
Figure 12B:
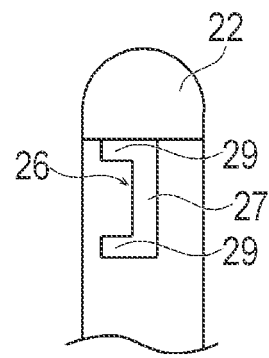

In addition, as in a fourth modification shown in FIG. 12A, the marker comparison portion 29 may extend from each of the distal end portion and a proximal end portion of the marker identification portion 27 to one side in the circumferential direction. In addition, as in a fifth modification shown in FIG. 12B, a direction in which the marker comparison portion 29 extends in the circumferential direction from each of the distal end portion and the proximal end portion of the marker identification portion 27 may be a direction opposite to that in the fourth modification.

Figure 13A:
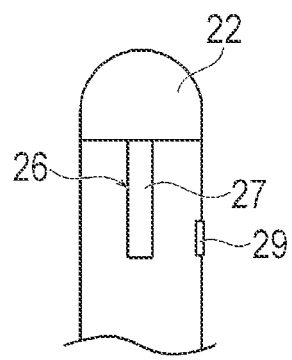
Figure 13B:
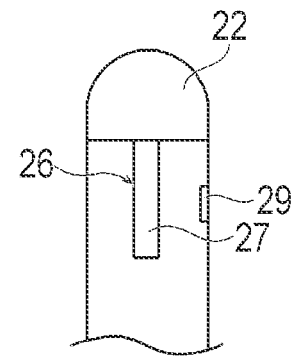
Figure 13C:
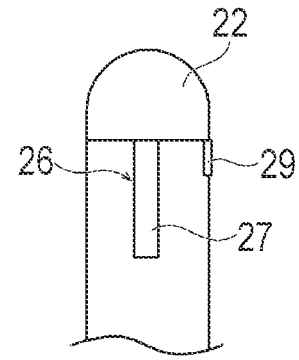

In addition, as in a sixth modification shown in FIG. 13A, the marker comparison portion 29 is not the distal end cap 22 and may be disposed at a predetermined angle away from the distal end marker 26 toward one side in the circumferential direction. A length of the marker comparison portion 29 in the axial center direction of the outer sheath 20 is smaller than a length of the marker identification portion 27 in the axial center direction. Since the shape of the marker comparison portion 29 is different from the shape of the marker identification portion 27, the operator can identify the marker identification portion 27 without confusion with the marker comparison portion 29. The marker comparison portion 29 is disposed away from the proximal end portion of the distal end marker 26 toward one side in the circumferential direction at a predetermined angle (for example, 90°). The length of the marker comparison portion 29 in the circumferential direction is not particularly limited, and may be, for example, larger, smaller, or substantially the same as the length of the marker identification portion 27 in the circumferential direction. The operator can identify the direction to which the marker identification portion 27 faces by comparing the position or shape of the marker identification portion 27 with the position or shape of the marker comparison portion 29 based on the X-ray image. Since the marker comparison portion 29 is not disposed in both directions in the circumferential direction from the marker identification portion 27, the operator can identify the positional relationship of the marker identification portion 27 with respect to the marker comparison portion 29 in the depth direction only based on the image obtained by X-ray imaging. The position of the marker comparison portion 29 in the axial center direction with respect to the marker identification portion 27 is not particularly limited. For example, as in a seventh modification shown in FIG. 13B, the marker comparison portion 29 may be disposed away from the substantially center of the marker identification portion 27 in the axial center direction toward one side in the circumferential direction. In addition, as in an eighth modification shown in FIG. 13C, the marker comparison portion 29 may be disposed away from the distal end portion of the marker identification portion 27 toward one side in the circumferential direction.

Figure 14A:
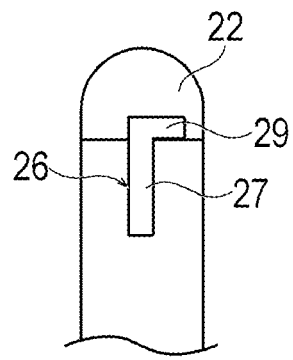
Figure 14B:
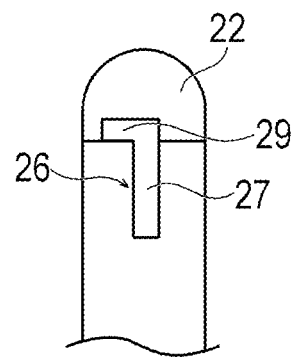

In addition, as in a ninth modification shown in FIG. 14A, the marker comparison portion 29 may extend from a distal end portion of the distal end marker 26 to one side in the circumferential direction by a predetermined length at a position overlapping the distal end cap 22. It is preferable that the distal end cap 22 is not radiopaque so that the marker comparison portion 29 overlapping with the distal end cap 22 can be identified by the X-ray image. In addition, as in a tenth modification shown in FIG. 14B, a direction in which the marker comparison portion 29 extends in the circumferential direction from the distal end portion of the marker identification portion 27 may be a direction opposite to that in the ninth modification.

Figure 15A:
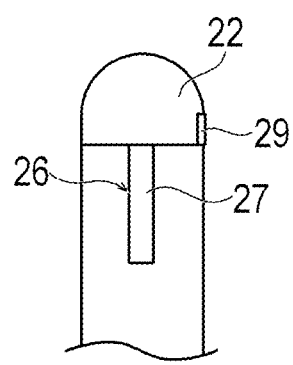
Figure 15B:
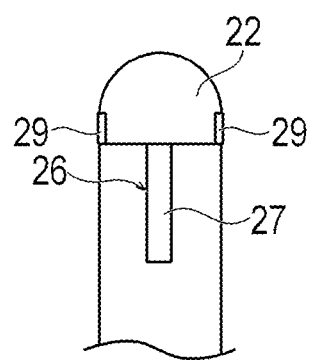

In addition, as in an eleventh modification shown in FIG. 15A, the marker comparison portion 29 may be disposed at a position that overlaps the distal end cap 22 and is separated from the distal end portion of the distal end marker 26 toward one side in the circumferential direction at a predetermined angle (for example, 90°). It is preferable that the distal end cap 22 is not radiopaque so that the marker comparison portion 29 overlapping with the distal end cap 22 can be identified by the X-ray image. In addition, as in a twelfth modification shown in FIG. 15B, the marker comparison portion 29 may be disposed at a predetermined angle (for example, 90°) away from the distal end portion of the marker identification portion 27 toward both sides in the circumferential direction.

In addition, the ultrasound catheter may have a configuration in which the transducer does not rotate.

In addition, the three-dimensional model image U2 may also be displayed on the same screen as the two-dimensional ultrasound image on which the mark M is provided. Accordingly, the operator can rather easily grasp in which direction of the body of the patient the mark M on the two-dimensional ultrasound image is attached.

Figure 16:
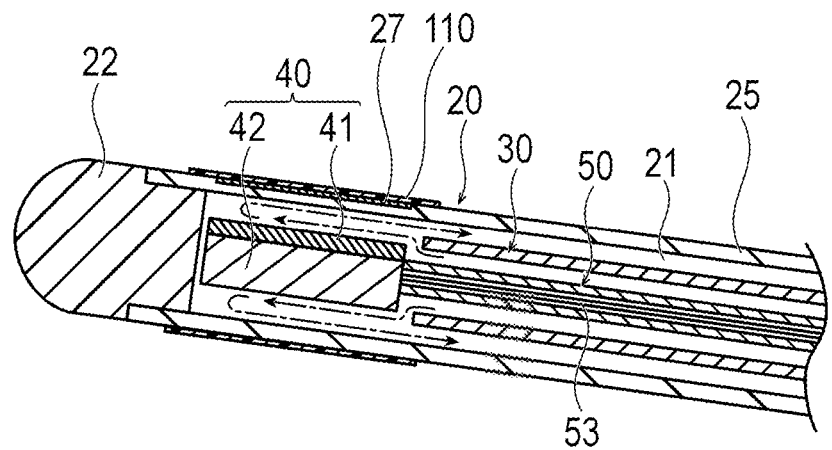
FIG. 16 is a cross-sectional view showing a thirteenth modification of the ultrasound catheter.

In addition, as in a thirteenth modification shown in FIG. 16, a covering tube 110 made of the same material as that of the outer sheath 20 may be covered so as to cover an outer circumferential surface of the marker identification portion 27 disposed on the outer circumferential surface of the outer sheath 20. Since the covering tube 110 is fixed to and integrated with a contact portion of the outer sheath 20 by heat, the marker identification portion 27 is not exposed or located on an outer surface of the outer sheath 20 of the catheter 10. Accordingly, it is possible to prevent the marker identification portion 27 from rubbing against an inner wall of a blood vessel and damaging the inner wall of the blood vessel and to prevent the marker identification portion 27 from falling off. The covering tube 110 is preferably made of the same material as that of the contact portion of the outer sheath 20. Accordingly, it is possible to fuse boundary surfaces between the covering tube 110 and the portion of the outer sheath 20 by heat so as to more reliably prevent the covering tube 110 from being rolled up or falling off from the outer sheath 20.

In addition, the marker identification portion 27 and an ultrasound emission surface of the transducer 41 may be parallel to each other. Specifically, both a surface of the marker identification portion 27 facing the transducer 41 (an inner surface in the radial direction) and the ultrasound emission surface of the transducer 41 are disposed substantially parallel to the axial center of the outer sheath 20. Accordingly, it is rather easy to identify the direction in which the marker identification portion 27 is located in the two-dimensional ultrasound image obtained from the transducer unit 40.

Further, a surface of the marker identification portion 27 facing the axial center of the outer sheath 20, that is, the surface facing the inner side in the radial direction is subjected to a surface roughening treatment to form fine irregularities (irregularities), so that more ultrasound can be reflected, and a strong white color can be formed more clearly in the two-dimensional ultrasound image. Therefore, in the two-dimensional ultrasound image obtained from the transducer unit 40, the direction in which the marker identification portion 27 is located is easily identified by the white color formed by the surface roughening treatment.

The detailed description above describes embodiments of an ultrasound catheter and an ultrasound catheter system that acquire an image by insertion into a lumen such as a heart or a blood vessel. The invention is not limited, however, to the precise embodiments and variations described. Various changes, modifications and equivalents may occur to one skilled in the art without departing from the spirit and scope of the invention as defined in the accompanying claims. It is expressly intended that all such changes, modifications and equivalents which fall within the scope of the claims are embraced by the claims.

What is claimed is:

1. A method for acquiring an image in a lumen of a living body, the method comprising:

inserting an ultrasound catheter into the lumen of the living body, the ultrasound catheter including an outer sheath including an accommodation lumen extending from a proximal end to a distal end of the outer sheath, a drive shaft configured to be movable in the outer sheath along an axial center of the outer sheath, a transducer disposed in the accommodation lumen and fixed to a distal end of the drive shaft, the transducer configured to transmit and receive ultrasound, and a radiopaque distal end marker disposed at a distal end portion of the outer sheath, wherein the distal end marker includes a marker identification portion extending along the axial center on a part in a circumferential direction of the distal end marker, and a marker comparison portion formed in a circumferential direction or a radial direction of the outer sheath, the marker comparison portion having one or more of a length and an arrangement different from that of the marker identification portion;

observing the marker comparison portion and the marker identification portion in a X-ray image and adjusting a direction the marker identification portion in the circumferential direction such that the marker identification portion faces a particular side of a patient in the X-ray image by changing a position of the marker identification portion in the circumferential direction with rotating the outer sheath about the axial center;

acquiring image data from the transducer of the ultrasound catheter;

generating a two-dimensional ultrasound image of an XY plane orthogonal to the axial center of the outer sheath;

displaying the generated two-dimensional ultrasound image on the display unit;

identifying a marker direction represented by a white acoustic artifact caused by presence of the marker identification portion or the strong black color indicating that there is almost no reflection of the ultrasound on the generated two-dimensional ultrasound image;

adjusting the marker direction to a particular direction on the generated two-dimensional ultrasound image by rotating the generated two-dimensional ultrasound image displayed on the display unit around the axial center;

generating a three-dimensional image of a living tissue by laminating a plurality of the two-dimensional ultrasound images obtained from the transducer in a pull-back direction; and displaying the three-dimensional image of the living tissue on the display unit and applying the identified marker direction of the marker identification portion to three-dimensional coordinates as a direction of the marker identification portion in the three-dimensional image of the living tissue.

2. The method according to claim 1, further comprising:

rotating the transducer of the ultrasound catheter to receive and transmit ultrasound along the XY plane orthogonal to the axial center of the outer sheath and generating the two-dimensional ultrasound image of the XY plane orthogonal to the axial center of the outer sheath.

3. The method according to claim 1, further comprising:

automatically identifying a direction of the marker identification portion in the two-dimensional ultrasound image and the three-dimensional image of the living tissue, or identifying the direction of the marker identification portion by an input from an input unit; and displaying a mark indicating the direction of the marker identification portion on the display unit together with the two-dimensional ultrasound image and the three-dimensional image of the living tissue.

4. The method according to claim 1, further comprising:

generating a three-dimensional model image indicating a simple shape of a human body on three-dimensional coordinates different from those of the three-dimensional image of the living tissue;

synchronizing directions of the three-dimensional image of the living tissue and the three-dimensional model image; and displaying the three-dimensional image of the living tissue and the three-dimensional model image on the display unit.

5. The method according to claim 4, further comprising:

receiving the information for changing the direction of the three-dimensional image of the living tissue or the three-dimensional model image on the display unit;

changing the directions of the three-dimensional image of the living tissue and the three-dimensional model image in synchronization with each other; and displaying the three-dimensional image of the living tissue and the three-dimensional model image on the display unit.

* * * * *